No. 890,991. PATENTED JUNE 16, 1908.
W. F. MARSH.
HOE.
APPLICATION FILED SEPT. 21, 1907.
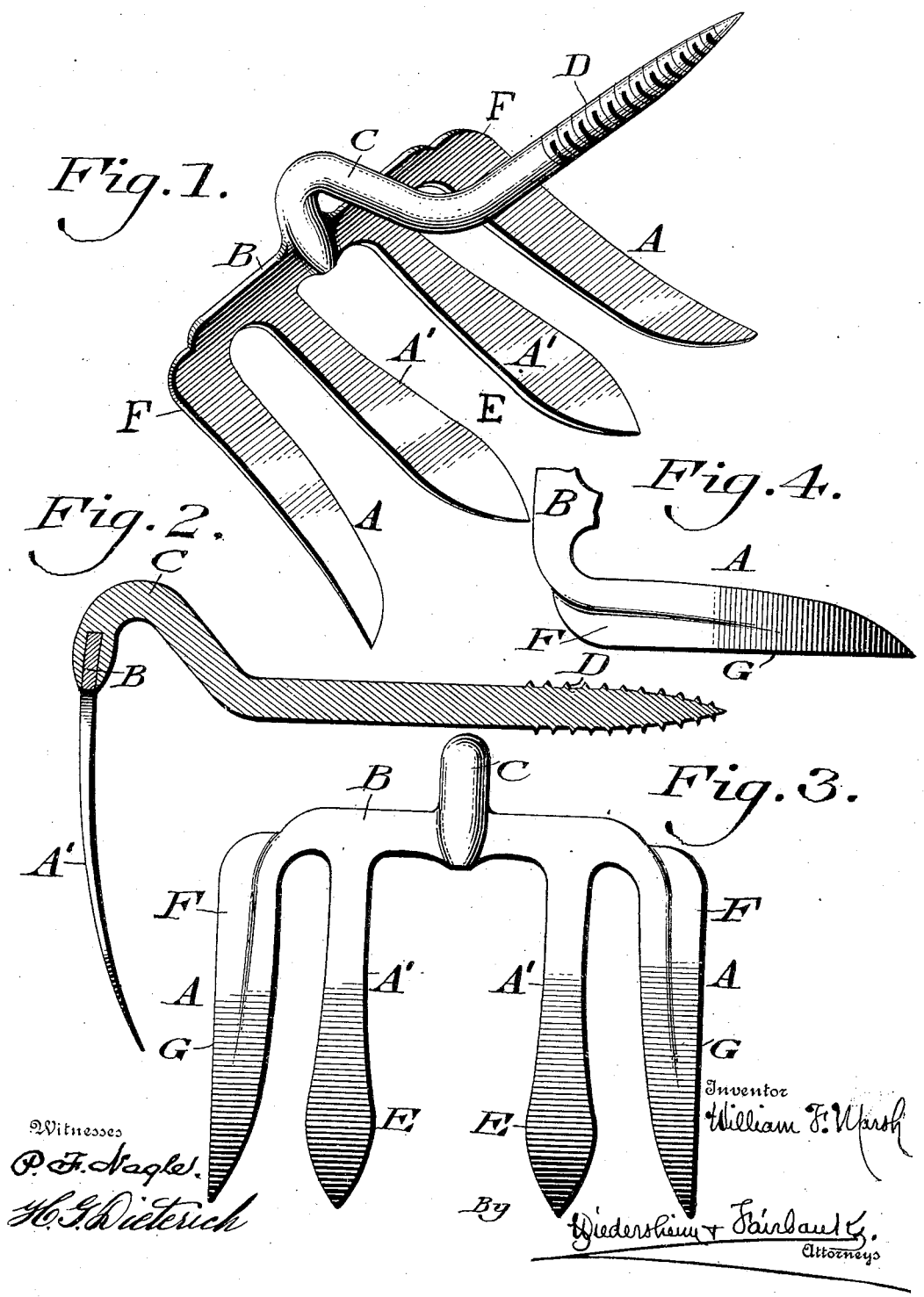

UNITED STATES PATENT OFFICE.

WILLIAM F. MARSH, OF MALAGA, NEW JERSEY.

HOE.

No. 890,991.     Specification of Letters Patent.     Patented June 16, 1908.

Application filed September 21, 1907. Serial No. 393,888.

*To all whom it may concern:*

Be it known that I, WILLIAM F. MARSH, a citizen of the United States, residing at Malaga, county of Gloucester, State of New Jersey, have invented a new and useful Hoe, of which the following is a specification.

My invention consists of a hoe having blades of novel construction and arrangement whereby the hoe possesses many advantages as will be hereinafter set forth, the novel features being pointed out in the claims.

Figure 1 represents a perspective view of a hoe embodying my invention. Fig. 2 represents a longitudinal section thereof. Fig. 3 represents a front elevation of a hoe embodying my invention. Fig. 4 represents a face view of a portion thereof turned at a right angle to Fig. 3.

Similar letters of reference indicate corresponding parts in the figures.

Referring to the drawings:—A, A' designate the tines or blades of the hoe and B designates the head with which the same are connected and to which the shank C is attached, the latter being adapted to be secured to a suitable handle, in the present case, by means of the screw threads D on said shank. The blades have their working faces flat and dishing or scoop-shaped in the direction of their length and pointed on their ends, and the body blades A' are broadened as at E. By these means, the blades may readily and easily penetrate the ground, and pulverize and rake the same without necessarily cutting the vines and roots of plants. The side blades A are extended laterally or outwardly by means of auxiliary blades F thereon, whose outer edges G are right-lined or straight, whereby the hoe may be turned sidewise and the edges G employed to cut weeds, grass, etc. The blades A' are spaced apart to an extent at the central portion of the hoe, whereby they may straddle plants or truck while cultivating the latter without injuring the same.

While I have specified certain means for carrying out my improvements, I do not wish to be limited exactly to the same, but desire to make such changes as may come within the scope of the novelty involved.

Having thus described my invention, what I claim as new and desire to secure by Letters Patent, is:—

1. A hoe having a plurality of side and intermediate blades, the intermediate blades occupying positions on opposite sides of the center of the hoe and placed apart to freely straddle plants, etc., said side blades upon the outer sides of the intermediate blades having the inner faces of their points curved outwardly, the points of the intermediate blades being broadened at their ends and having scoop shaped faces in the direction of the length of the blades.

2. As an improved article of manufacture, a hoe comprising a head with side and intermediate blades, the side blades having each an auxiliary blade integral with and extending laterally therefrom with the outer edges right-lined to serve as cutters.

3. As an improved article of manufacture, a hoe comprising a head with side and intermediate blades, the side blades having each an auxiliary blade integral with and extending laterally therefrom with the outer edges right-lined to serve as cutters, the inner faces of the side blades being curved outwardly and the intermediate blades pointed at their penetrating ends and broadened near said ends and having scoop shaped faces in the direction of the length of the blades.

WILLIAM F. MARSH.

Witnesses:
   ELWOOD E. DOWNS,
   THOMAS S. DOWNS.